(12) United States Patent
Shackleton et al.

(10) Patent No.: US 7,260,134 B2
(45) Date of Patent: Aug. 21, 2007

(54) DIELECTRIC COUPLED CO$_2$ SLAB LASER

(75) Inventors: Christian J. Shackleton, Los Gatos, CA (US); Phillip J. Gardner, West Hartford, CT (US); Anthony J. DeMaria, West Suffield, CT (US); Vernon Seguin, Windsor, CT (US); John T. Kennedy, Granby, CT (US)

(73) Assignee: Coherent, Inc., Santa Clara, CA (US)

( * ) Notice: Subject to any disclaimer, the term of this patent is extended or adjusted under 35 U.S.C. 154(b) by 236 days.

(21) Appl. No.: 10/869,964

(22) Filed: Jun. 17, 2004

(65) Prior Publication Data

US 2005/0175054 A1 Aug. 11, 2005

Related U.S. Application Data

(63) Continuation-in-part of application No. 10/773,506, filed on Feb. 6, 2004, now abandoned.

(51) Int. Cl.
*H01S 3/22* (2006.01)
*H01S 3/097* (2006.01)

(52) U.S. Cl. ............................. 372/87; 372/55; 372/58

(58) Field of Classification Search .................. 372/58, 372/87, 55
See application file for complete search history.

(56) References Cited

U.S. PATENT DOCUMENTS 3,745,481 A 7/1973 Erickson et al. ........... 331/94.5

(Continued)

FOREIGN PATENT DOCUMENTS

DE 40 07 588 A1 9/1991

(Continued)

OTHER PUBLICATIONS

A.D. Colley et al., "High brightness slab waveguide carbon monoxide laser," *Appl. Phys. Lett.*, vol. 64, No. 22, May 30, 1994, pp. 2916-2918.

J. Xin et al., "Radio frequency discharge excited diffusively cooled kilowatt carbon monoxide slab waveguide laser with a three mirror resonator," *Applied Physics Letters*, vol. 75, No. 10, Sep. 6, 1999, pp. 1369-1370.

*Primary Examiner*—Minsun Harvey
*Assistant Examiner*—Marcia A. Golub
(74) *Attorney, Agent, or Firm*—Stallman & Pollock LLP (57) ABSTRACT

An slab CO2 laser includes spaced-apart elongated slab electrodes. A lasing gas fills a discharge gap between the electrodes. An RF power supply is connected across the electrodes and sustains an electrical discharge in the lasing gas in the discharge gap. Either one or two ceramic inserts occupy a portion of width of the electrodes and in contact with the electrodes. A discharge gap is formed between the portions of the width of the electrodes not occupied by the insert or inserts. Provision of the ceramic insert or inserts increases the resistance-capacitance (RC) time constant of the electrode impedance by increasing the capacitive component of the time constant. This hinders the formation of arcs in the discharge, which, in turn enables the inventive laser to operate with higher excitation power or higher lasing-gas pressure than would be possible without the dielectric insert. The ceramic insert also decreases the difference in impedance of the electrodes with and without a discharge. This leads to a better-behaved discharge, and a discharge that is easier to light.

6 Claims, 7 Drawing Sheets

U.S. PATENT DOCUMENTS

| | | |
|---|---|---|
| 3,748,594 A | 7/1973 | Pugh .......................... 331/94.5 |
| 3,828,277 A | 8/1974 | Otto et al. ................. 331/94.5 |
| 4,686,682 A | 8/1987 | Haruta et al. ................. 372/87 |
| 4,710,941 A * | 12/1987 | Sluss et al. .................... 372/87 |
| 4,939,738 A | 7/1990 | Opower ........................ 372/95 |
| 5,088,102 A | 2/1992 | Krueger et al. ............... 372/64 |
| 5,123,028 A | 6/1992 | Hobart et al. ................. 372/95 |
| 5,353,297 A | 10/1994 | Koop et al. .................... 372/64 |
| 5,379,317 A | 1/1995 | Bridges et al. ............... 372/64 |
| 5,982,803 A | 11/1999 | Sukhman et al. ............. 372/87 |
| 6,192,061 B1 | 2/2001 | Hart et al. ..................... 372/87 |
| 6,363,094 B1 * | 3/2002 | Morton et al. ................ 372/59 |
| 2003/0058913 A1 | 3/2003 | Shackleton et al. ........... 372/55 |

FOREIGN PATENT DOCUMENTS

| | | |
|---|---|---|
| WO | WO8706773 A1 * | 11/1987 |
| WO | WO8800403 A1 * | 1/1988 |
| WO | WO 00/21167 | 4/2000 |

* cited by examiner

DIELECTRIC COUPLED CO₂ SLAB LASER

CLAIM OF PRIORITY

This application is a continuation-in-part of application Ser. No. 10/773,506, filed Feb. 6, 2004 now abandoned, which is incorporated herein by reference.

TECHNICAL FIELD OF THE INVENTION

The present invention relates generally to carbon dioxide ($CO_2$) slab lasers. The invention relates in particular to a slab laser having a dielectric coupling-element between metal slab electrodes.

DISCUSSION OF BACKGROUND ART $CO_2$ lasers are commonly used in commercial manufacturing for operations such as cutting or drilling, in particular, in nonmetallic materials. One form of $CO_2$ laser suited for such operations is known to practitioners of the art as a "slab" laser. Such a laser has an assembly including a pair of elongated, slab-like planar electrodes arranged face-to-face and spaced apart to define a gap between the electrodes. The electrodes are usually contained in a gas tight enclosure. The enclosure and the gap between the electrodes are filled with a lasing gas mixture including $CO_2$. A radio frequency (RF) potential is applied across the electrodes to cause an electrical discharge in the $CO_2$ laser gas mixture. The discharge energizes the $CO_2$ lasing gas. A pair of mirrors is arranged, with one thereof at each end of the pair of electrodes, to form a laser resonator. A preferred type of resonator is an unstable resonator. The energized $CO_2$ lasing gas provides optical gain allowing laser radiation to be generated in the resonator. The electrodes form a waveguide or light guide for the laser radiation in an axis of the resonator perpendicular to the plane of the electrodes. This confines the lasing mode of the resonator in that axis. The mirrors define the lasing mode in an axis parallel to the plane of the electrodes. In an unstable resonator arrangement, laser radiation is delivered from (in effect, spilled out of) the resonator by bypassing one of the resonator mirrors.

In a slab laser used for drilling, cutting, and other machining operations a high output power, for example, greater than about 100 Watts (W), and maximum possible efficiency are important. In any given slab laser configuration, available output power generally increases with increasing gas pressure, provided that there is sufficient RF power to maintain a full discharge. Further, when operating in a pulsed-mode, faster rise and fall times for the pulses are possible at the higher pressure. A common problem limiting the output power of a slab laser is instability of the RF discharge. As RF power to the discharge (pump power) is increased to increase output power, the discharge eventually becomes unstable and is constricted into arcs. This adversely affects mode quality and efficiency of the lasers. This problem is exacerbated by higher gas pressures. Another problem in RF-energized slab lasers results from a substantial difference in RF impedance across the electrodes when there is no discharge (an "unlit" condition) from the RF impedance across the electrodes when there is a discharge (a "lit" condition). This impedance difference causes a change (a drop) in the resonant RF frequency when the discharge is ignited, i.e., the laser is changed from the unlit to the lit condition. Further, increasing gas pressure increases the difficulty of igniting the discharge, i.e., in turning on the laser. There is a need for an improvement of discharge stability in high peak power slab lasers.

SUMMARY OF THE INVENTION

In one aspect a laser in accordance with the present invention comprises first and second elongated electrodes arranged spaced apart and face-to-face. At least one solid dielectric insert extends longitudinally along the length of said electrodes. A first portion of the insert is located between the electrodes in contact therewith and a second portion of the insert extends laterally beyond corresponding edges of the electrodes. The first portion of the insert has a width less than the width of said electrodes, thereby leaving an elongated gap between said electrodes. The gap is filled with a lasing gas. A pair of mirrors is configured and arranged to define a laser resonant cavity extending through said elongated gap. Means are provided for exciting the lasing gas to create a gas discharge, thereby causing laser radiation to circulate in the resonant cavity. The height of the gap is selected such that the gap forms a waveguide for the laser radiation in the height direction. The width of said gap is selected such that the laser radiation is allowed to propagate in free space in the width direction of the gap in a manner controlled by the configuration and arrangement of the mirrors.

The dielectric insert increases the resistance-capacitance (RC) time constant of the electrode impedance by increasing the capacitive component of the time constant. This hinders the formation of arcs in the discharge, which, in turn enables the inventive laser to operate with higher excitation power or higher lasing-gas pressure than would be possible without the dielectric insert. The ceramic insert also decreases the difference in impedance of the electrodes with and without a discharge. This leads to a better-behaved discharge, and a discharge that is easier to light.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
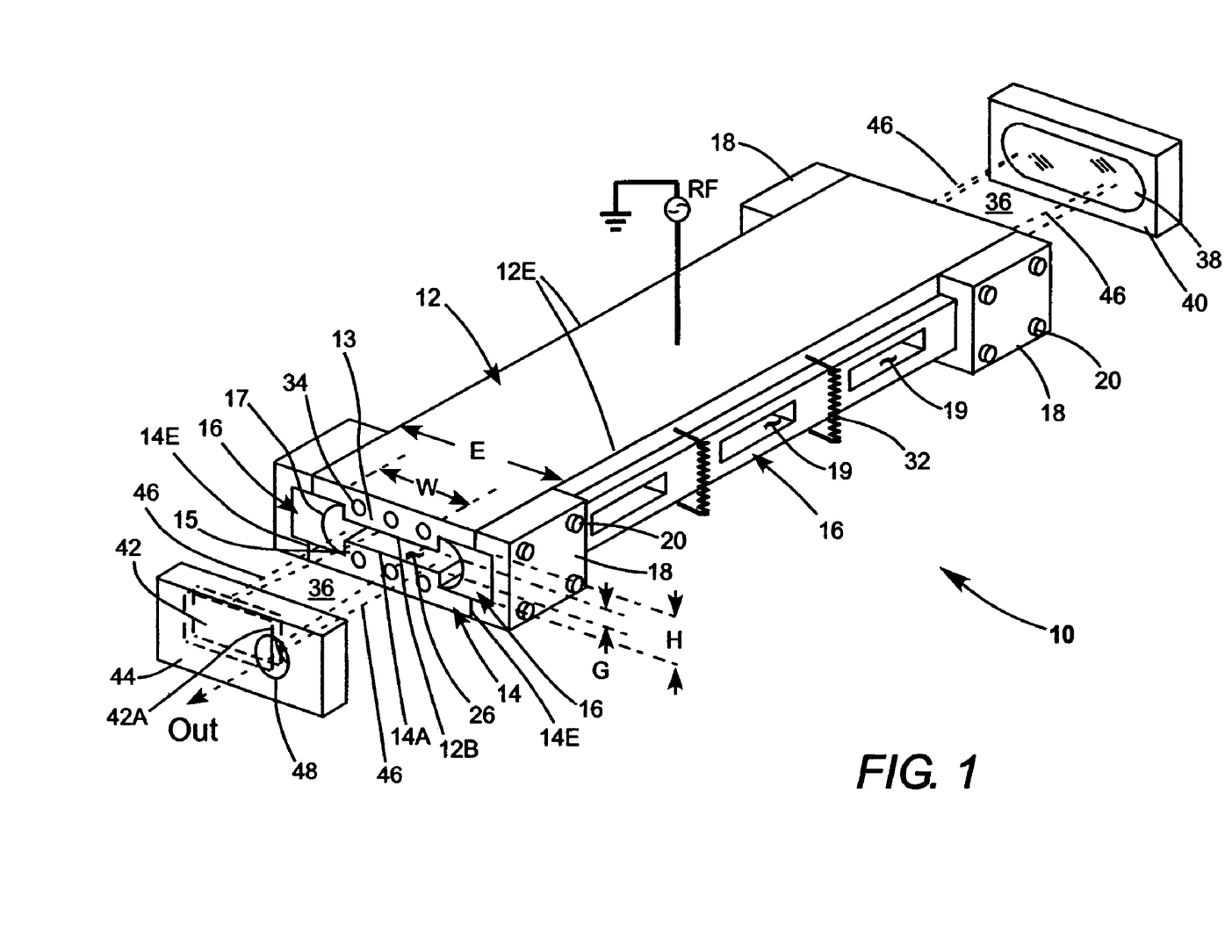
FIG. 1 schematically illustrates one preferred embodiment of a $CO_2$ slab laser in accordance with the present invention including first and second elongated metal slab electrodes arranged face-to-face and spaced apart by two ceramic inserts extending laterally partway between the electrodes and longitudinally along the length of the electrodes, and also including two mirror forming a one-axis unstable resonator extending between the electrodes.

Turning now to the drawings, wherein like components are designated by like reference numerals, FIG. 1 schematically illustrates one preferred embodiment 10 of a $CO_2$ slab laser in accordance with the present invention. Laser 10 includes upper and lower elongated slab electrodes 12 and 14, respectively, arranged spaced-apart and face-to-face. The electrodes have an overall width E. The electrodes are spaced apart by dielectric (ceramic) inserts or spacers 16 having a height H, and extending laterally, i.e., in the width direction of the electrodes, partway between the electrodes. Inserts 16 preferably also extend laterally beyond longitudinal edges respectively 12E and 14E of the electrodes by at least about 2.0 millimeters (mm). Most preferably, inserts 16 extend at least about 5.0 mm beyond the electrode edges. Inserts 16, here, further extend along the entire length of the electrodes. This lateral extension of ceramic inserts 16 increases the surface path length from electrode 12 to electrode 14 across the ceramic insert, thereby increasing the surface resistance across the ceramic to minimize the possibility of arc or discharge formation between the electrode edges.

The assembly of electrodes and inserts is held together by ceramic clamps 18 attached to electrodes 12 and 14 by screws 20. Preferred ceramic materials for inserts 16 include alumina (aluminum oxide—$Al_2O_3$), beryllia (beryllium oxide—BeO), zirconia (zirconium dioxide $ZrO_2$) and zirconia and alumina mixtures. Alumina is also a preferred material for ceramic clamps 18.

The cross-section configuration of electrodes 12 and 14, and the thickness of inserts 16 is selected such that there is a gap 26 (the discharge gap), having a height G, between thick central portions respectively 13 and 15 of electrodes 12 and 14. The electrode surfaces 12B and 14A bounding the gap are parallel to each other. Gap 26 has a width W, here, determined by the width of the thick portions of the electrodes. Width W of course, is less than the total width E of the electrodes. The stepped cross-section shape of the electrodes, with thinner portions of the electrodes on either side of gap 26, provides that height H of inserts 16 can be greater than the height G of discharge gap 26. This provides that the corresponding edges of the electrodes are further apart than electrode surfaces 12B and 14A of the electrodes forming the gap. This minimizes the possibility of a discharge forming between the electrode edges. The capacitance ($C_X$) added by the ceramic inserts can be approximated to a first order by an equation:

$$C_X = \in (E-W)L/H \quad (1)$$

where $\in$ is the dielectric constant of the ceramic and L is the length of the electrodes. The percentage of space between the electrodes occupied by the ceramic ($P_C$) is approximated by an equation:

$$P_C = 100(E-W)/E \quad (2)$$

and $P_C$ is preferably at least about 30%.

The assembly of electrodes 12 and 14, ceramic inserts 16, and ceramic clamps 18 and ceramic slab 20 is contained in an enclosure (not shown) filled with a lasing gas mixture including $CO_2$. The lasing gas mixture fills gap 26. Ceramic inserts 16 include apertures 19 extending therethrough to facilitate flow of the lasing gas into gap 26. An RF potential is applied across electrodes 12 and 14. Here, the RF potential (supplied by an RF generator designated symbolically in FIG. 1) is applied to electrode 12 (the "hot" electrode), and electrode 14 (the ground electrode) is connected to ground potential. Electrodes 12 and 14 are inductively coupled by inductors 32. Applying the RF potential across the electrodes sustains an electrical discharge in the lasing gas in gap 26, thereby exciting (energizing) the laser gas. Electrodes 12 and 14 include channels 34 that allow the passage of a cooling fluid through the electrodes to remove heat generated by the discharge.

The cooling water passages are typically constructed from materials that will not corrode when water is used as a coolant, for example, copper, nickel, or brass. Cooling channels should be arranged such that the flatness of electrodes 12 and 14 is not distorted by temperature gradients. An example of such an arrangement is described in U.S. Pat. No. 5,237,580, the complete disclosure of which is hereby incorporated by reference.

Energized $CO_2$ molecules in the discharge in gap 26 provide a gain medium for laser 10. Laser 10 includes a hybrid resonator formed including a waveguide resonator and an unstable resonator 36. Unstable resonator 36 is formed by a concave mirror 38 held in a mirror holder 40, and a concave mirror 42 (indicated in phantom in FIG. 1) held in a mirror holder 44. Both mirror 38 and mirror 42 preferably have a reflectivity of about 99.5% or greater at the laser wavelength. The width W of gap 26 is selected such that laser radiation propagates in free space in a direction parallel to the electrodes, i.e., in the width direction of the gap. The mode propagation is determined, inter alia, by the spacing and curvature of the mirrors and the location of straight edge 42A of mirror 42.

In this example, the mirrors of unstable resonator 36 are arranged and configured such that laser radiation circulates through gap 26 between electrodes 12 and 14 in a zigzag fashion, as indicated by dashed lines 46. The laser radiation exits the resonator around edge 42A of mirror 42 and then through an aperture 48 in mirror holder 44. Concave curved walls 17 of ceramic inserts bound gap 26 on opposite sides thereof. It is advantageous to roughen the surface of curved walls 17 of ceramic inserts 16 to avoid the possibility of any waveguide action by these walls that could interfere with the function of mirrors 38 and 42 in determining laser modes in the width direction of the electrodes. The curvature of walls 17 also serves to increase the surface resistance of the ceramic inserts between the electrodes as discussed above.

The waveguide portion of laser resonator is defined by electrodes 12 and 14 and mirrors 38 and 42 and is perpendicular to the above described unstable resonator portion. Height G of gap 26 is selected such that plane parallel surfaces 12B and 14A of electrodes 12 and 14, respectively, effectively form a waveguide for laser radiation in a direction perpendicular to the plane of electrodes 12 and 14, i.e., in the height direction of the gap. The waveguide portion of the resonator is completed by mirrors 38 and 42. Laser radiation propagation modes are restricted, in that direction only, by the waveguide effect. Height G of gap 26 is further selected to provide a desired far field beam profile in combination with maximum laser power.

Figure 1A:
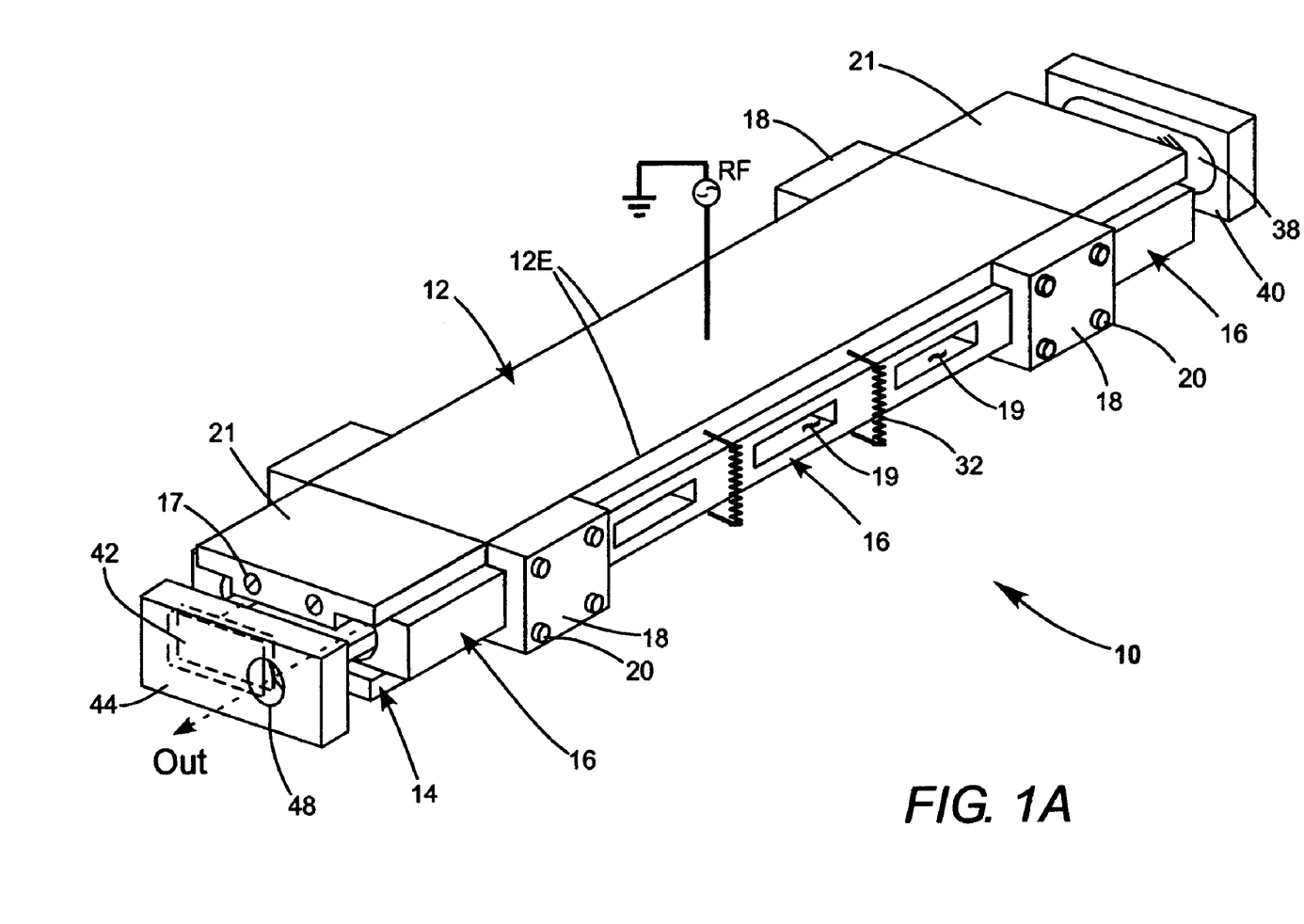
FIG. 1A schematically illustrates the laser of FIG. 1 further including ceramic mirror-shields located between the ends of the electrodes and the mirrors.

It is preferable to space mirrors 38 and 42 at a distance from the ends of electrodes 12 and 14 sufficient that the mirrors are not degraded by the discharge in gap 26. Preferably the spacing is about 20.0 mm or greater. Such a spacing, however, can lead to optical losses of laser radiation being redirected into gap 26 by the mirrors. One means of minimizing such optical losses is depicted in FIG. 1A. Here laser 10 includes a ceramic (dielectric) extension 21 at each end of electrode 12. Extension 21 is attached to electrode 12 by countersunk screws 17 extending through the ceramic extension and into the electrode. The electrode 14 extends under the ceramic extensions. Ceramic extensions 21 preferably have the same cross-section shape as electrode 12. Spacing between the ceramic extensions and electrode 14 is similar to the spacing between electrodes 12 and 14. Extensions 21 (in cooperation with opposing electrode 14) provides a waveguiding effect similar to that provided by the electrodes. The extensions may extend to within about 5.0 mm of the mirror. Ceramic inserts 16 are correspondingly increased in length to extend at least partway along the length of the extensions.

Preferred dimensions G, E, W and H depend on desired operating parameters such as the lasing gas pressure, the frequency and power loading of the RF power applied to the electrodes and the output power of the laser. By way of example, for a gas pressure between about 80 and 200 Torr, an RF frequency of about 100 megahertz (MHz) and an output power between about 100.0 and 500.0 Watts (W), G is preferably between about 1.0 and 2.0 mm. Gap width W is preferably between about 20.0 and 80.0 mm for electrode length between 40.0 and 85.0 centimeters (cm). $P_C$ is preferably between about 30% and 70%. The ceramic insert height H is, determined, inter alia, by the dielectric constant of the dielectric material and the desired capacitive loading. Height H is preferably between about 2.0 mm and 6.0 mm for an alumina ceramic.

It should be noted here that only details of laser 10 sufficient for understanding principles of the present invention are described above. General aspects of $CO_2$ slab laser construction, such as lasing-gas enclosure, and RF power supplies and connection thereof, are well known in the art to which the present invention pertains and, accordingly, are not described in detail herein. A detailed description of examples of slab lasers is provided in U.S. Pat. No. 5,123,028 the complete disclosure of which is hereby incorporated by reference.

An object of locating ceramic inserts 16 between electrodes 12 and 14 is to increase the capacitive component of the impedance experienced by the applied RF potential in general, and to limit, in particular, the difference of this impedance in the lit and unlit conditions of the discharge in gap 26. In an unlit condition, this gas is effectively a dielectric and the electrodes and the gas-filled gap behave as a capacitor. In the lit condition, the gas is electrically conductive, and the capacitive effect of the electrodes and the gap therebetween is minimized. Including inserts 16 in the gap between the electrodes according to principles of the present invention provides a strong capacitive component of the electrode impedance even when the discharge in gap 26 is lit, and also minimizes the capacity difference between the lit and unlit conditions. Preferably the ceramic inserts should have an electrode-covered area greater than or equal to about 30% of the total area of the electrodes and most preferably between about 30% and 70% of the total area of the electrodes as noted above.

The greater the ratio or percentage area of the ceramic inserts, of course, the more dominant will be the spacers in determining the capacitive component of the electrode impedance and the smaller the difference in impedance in the lit and unlit conditions. If the area of the ceramic inserts exceeds about 70% of the total area of the electrodes the current required to charge and discharge the capacitance during an RF cycle increase to a point where the efficiency of the laser is compromised.

Figure 2:
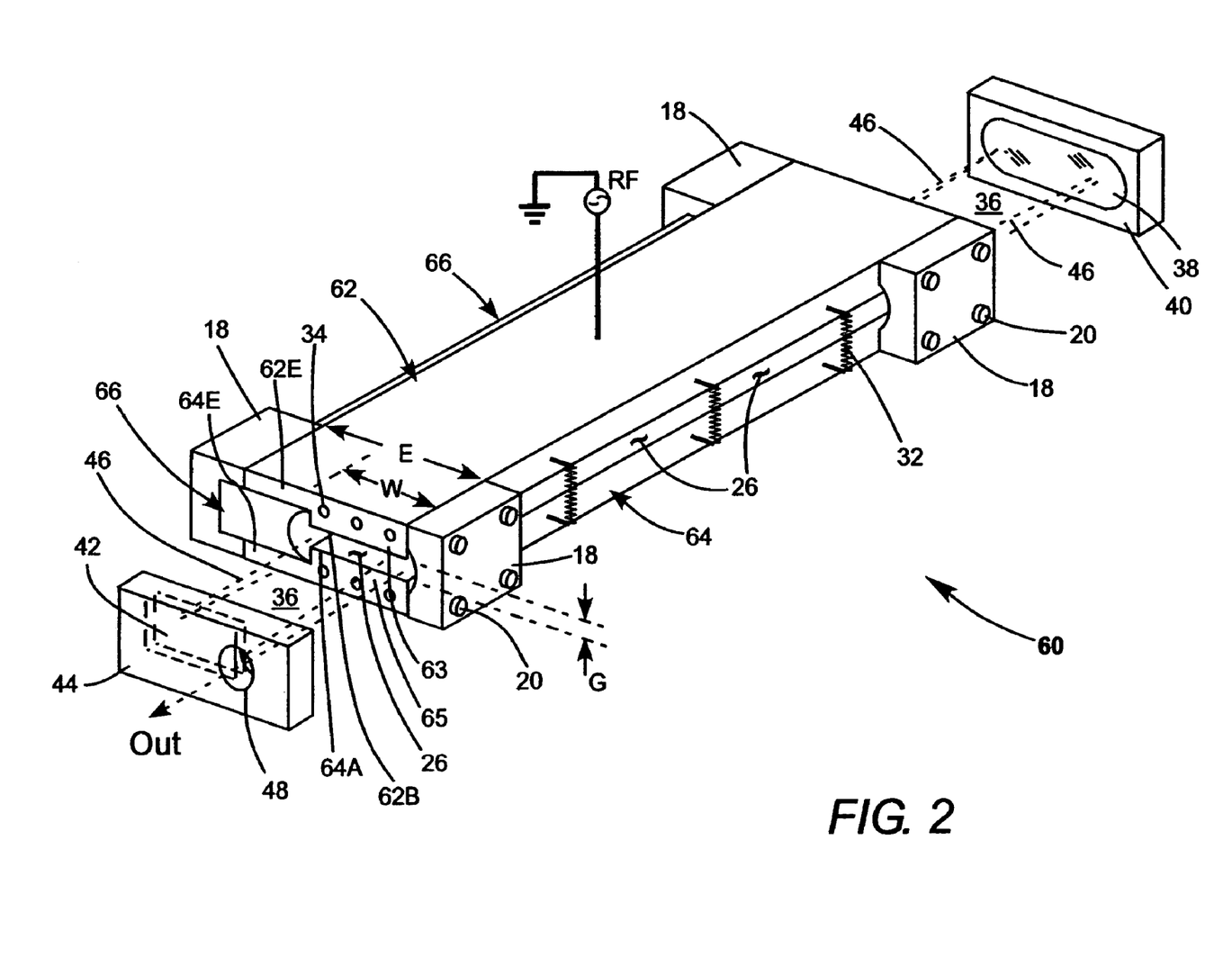
FIG. 2 schematically illustrates another preferred embodiment of a $CO_2$ slab laser in accordance with the present invention, similar to the laser of FIG. 1, but wherein there is only one ceramic insert extending laterally partway between the electrodes and extending along the length of the electrodes.

FIG. 2 schematically illustrates another embodiment 60 of a slab $CO_2$ laser in accordance with the present invention. Laser 60 includes first and second elongated slab electrodes 62 and 64. The electrodes are held spaced apart by ceramic clamps 18 as in laser 10. Electrodes 62 and 64 in laser 60 have the same width. Located between electrodes 62 and 64 between thin edge-portions 62E and 64E, respectively, thereof is a ceramic insert 66 extending laterally partway between the electrodes. Ceramic spacer 66 is in contact with both electrodes and extends along the entire length of the electrodes. Spacer 66 also extends laterally beyond corresponding edges of electrodes 62 and 64, preferably by at least 2.0 mm and most preferably by at least 5.0 mm for reasons discussed above with reference to inserts 16 of laser 10. Edge portions 63 and 65 of electrodes are thickened to permit, inter alia, insertion of fluid cooling channels 34. Surfaces 62B and 64A of electrodes 62 and 64 respectively, in thickened portions 63 and 65, respectively, thereof define a discharge gap 26. An RF discharge is created in gap 26 as described above with reference to laser 10 of FIG. 1. Gap 26 here again has a width W less than the overall width E of the electrodes. An unstable resonator 36 is formed by a concave mirror 38 a concave mirror 42 as described above with reference to laser 10 of FIG. 1.

The function of the single ceramic insert 66 is similar to that of the two ceramic inserts 16 of laser 10. Using only a single insert asymmetrically arranged only one pair of electrode edges leaves discharge gap 26 open along the opposite electrode edges except for a relatively small proportion, preferably less than about 20%, covered by ceramic clamps 18. This is very effective in facilitating flow of lasing gas into discharge gap 26 and for preventing acoustic resonances from occurring under pulsed discharge conditions.

In embodiments of the inventive slab laser described above, the assembly of slab electrodes, ceramic spacers and the ceramic insert between the electrodes is structurally independent of any enclosure containing the assembly and a lasing-gas mixture. It is possible, however, to integrate the electrode-ceramic assembly into such an enclosure. A description of one example of such an integrated structure is set forth below with reference to FIG. 3 and FIG. 4.

Figures 3, 4:
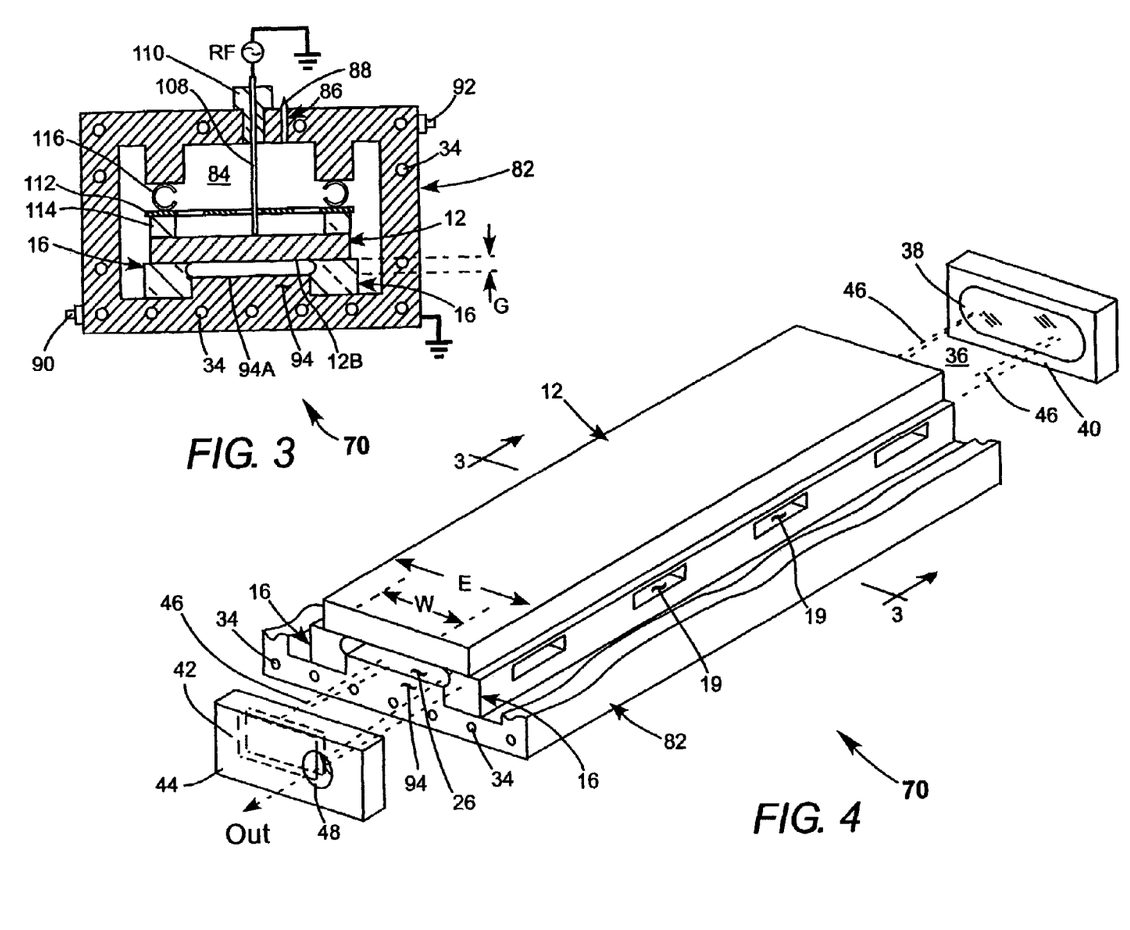
FIG. 3 is a cross-section view seen generally in the direction 3-3 of FIG. 4 schematically illustrating still another embodiment of a $CO_2$ slab laser in accordance with the present invention similar to the laser of FIG. 2 but wherein one of the slab electrodes is provided by a sealed enclosure surrounding the other electrode and the ceramic insert.
FIG. 4 is a three-dimensional view schematically illustrating details of the electrode and ceramic slab arrangement of FIG. 3.

FIG. 3 is a cross-section view schematically illustrating an embodiment 70 of a slab $CO_2$ laser in accordance with the present invention integrated into a metal enclosure 82. FIG. 4 is three-dimensional view schematically illustrating laser 70 with enclosure 82 partially cut away. Those skilled in the art will recognize that laser 70 is similar to laser 10 of FIG. 1 integrated into a water-cooled enclosure. Accordingly, components with a common function in the two lasers are designated by the same reference numeral even though there may be some slight difference in shape therebetween.

Enclosure 82 is preferably formed from machined aluminum components and is electrically connected to ground potential. Interior 84 of enclosure 82 is filled with a lasing gas via a port 86, the tip 88 of which can be sealed off to seal enclosure 82 once lasing-gas filling is complete. Cooling channels 34 are provided in the base, sidewalls, and top of enclosure 82. Cooling fluid is directed into the channels via an inlet port 90 and exits the channels via an outlet port 92.

A raised base-portion 94 of enclosure 82 forms a ground electrode for slab laser 70. A separate top or "hot" electrode 12 is spaced apart from ground electrode 94 by a two ceramic inserts 16. Electrode 12 has an overall width E. Raised portion 94 of housing 82 (the ground electrode) has a width W. Inserts 16 extend laterally partway between electrodes 12 and 94 and along the entire length of the electrodes. A discharge gap 26 is formed between upper surface 94A of ground electrode 94 and lower surface 12B of electrode 12. The gap-spacing G is defined by ceramic inserts 16. Gap 26 has a width W defined by the width of raised portion 94 of housing 82. Apertures 19 extend through the ceramic inserts in fluid communication with discharge gap 26.

A discharge is sustained in gap 26 by an RF potential applied across the gap. RF power is supplied by an RF generator designated only symbolically in FIG. 3. The generator is attached to a connector 108, which enters enclosure 82 via an insulated feedthrough 110. An inductive path to ground is provided by a serpentine inductor 112 spaced apart from electrode 96 by ceramic insulating pads 114. Inductor 112 is connected to grounded enclosure 82 via low inductance, compressive springs 116. These springs also provide pressure for assisting clamps 18 hold the electrodes in contact with ceramic inserts 16, thereby maintaining the spacing of gap 26.

Referring in particular to FIG. 4, resonator arrangements for laser 80 are similar to those of other above-described embodiments of the inventive laser. An unstable resonator 36 is formed by a concave mirror 38 held in a mirror holder 40, and a concave mirror 42 (indicated in phantom in FIG. 4) held in a mirror holder 44. The unstable resonator is arranged such that laser radiation circulates through gap 26 between ceramic slab 20 and electrode in a zigzag fashion as indicated by dashed lines 46 before exiting the resonator via an aperture 48 in mirror holder 44.

Figure 5:
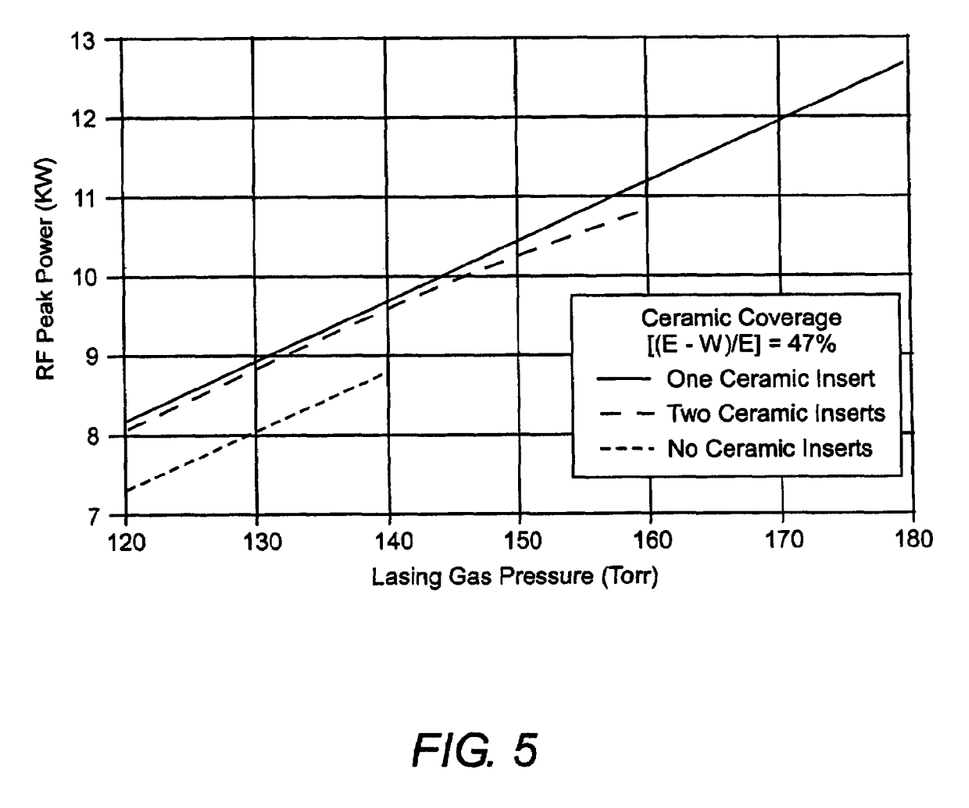
FIG. 5 is a graph schematically illustrating measured maximum RF peak power input to the electrodes as a function of lasing-gas pressure for an example of the laser of FIG. 1, an example of the laser of FIG. 2 and similarly configured prior-art laser without any ceramic inserts.

FIG. 5 is a graph illustrating measured peak RF power as a function of a laser similar in configuration to laser 10 of FIG. 2 (solid curve) having only one ceramic insert, a laser similar to the laser of FIG. 1 (long-dashed curve) having two ceramic inserts, and similarly configured laser without any ceramic inserts (short-dashed curve). The electrode length is about 60.0 cm; the electrode total width (E) is about 44.0 mm; and the gap height (G) is about 1.4 millimeters (mm). Mirrors 38 and 42 are spaced apart by about 64.0 cm. Ceramic waveguide extensions about 15.0 mm in length are clamped to each end of the electrodes. In the case of the lasers having the inventive ceramic insert or insert, the insert or inserts occupy a total of about 47% of the electrode width. Lasing gas was a mixture of helium (He) nitrogen ($N_2$) and $CO_2$ in a ratio 3:1:1. The laser was operated in an RF super-pulsed mode at a 12% duty cycle and at pulse repetition frequencies between 700 Hz and 10 KHz.

The maximum RF peak power is that maximum RF power applied to the discharge at which it is possible to sustain a stable discharge. At a higher RF peak power, the discharge becomes unstable and arcs begin to form in the discharge. The data of FIG. 5 indicate that in the case of the prior-art laser without a ceramic insert, it was not possible to sustain a discharge at any pressure greater than about 140 Torr. In the case of the inventive laser having two ceramic inserts (the laser of FIG. 1), it was not possible to sustain a discharge at any pressure greater than about 160 Torr, however, a peak input power of 10.8 kilowatts (KW) was possible at the highest pressure compared with 8.7 KW at the highest pressure for the prior-art laser. In the case of the inventive laser having only one ceramic insert (the laser of FIG. 2), leaving the discharge gap open (unconstrained) along one side thereof, a discharge was still sustainable at a pressure of 180 Torr, at which pressure a peak RF input power of 12.6 KW was possible. Here, a limit was reached because of reaching an upper limit for the output power of the available RF power supply used to power the test laser. Generally the output laser power scales with gas pressure and the input RF power.

Figure 6:
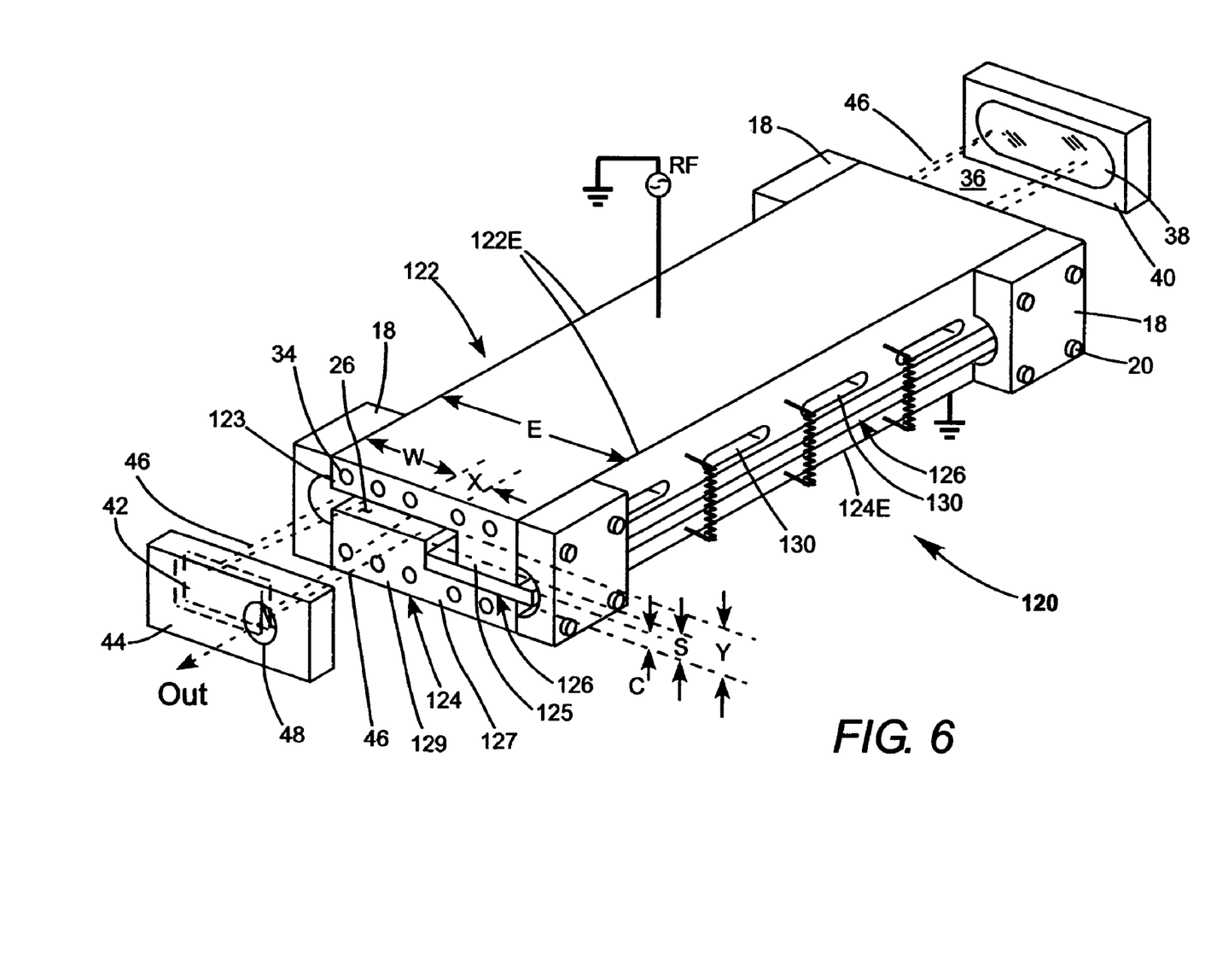
FIG. 6 illustrates still yet another preferred embodiment of a $CO_2$ slab laser in accordance with the present invention including first and second elongated metal slab electrodes each having a single-stepped cross-section stepped and arranged face-to-face with a ceramic insert extending laterally partway between the electrodes, longitudinally along the length of the electrodes and having a height less than the step height of the electrodes.

FIG. 6 schematically illustrates yet another embodiment 120 of a slab laser in accordance with the present invention. Laser 120 includes upper and lower slab electrodes 122 and 124 having a ceramic insert 126 therebetween. As in other above described embodiments of the inventive slab laser an unstable resonator 36 is formed by a concave mirror 38 and a concave mirror 42 with laser radiation circulating through a discharge gap 26 between the electrodes. In laser 120 the electrodes and the ceramic insert are arranged such that the discharge gap 26 is open along both sides thereof, so that there is no possibility of interference by the ceramic insert with laser modes determined by the resonator mirrors.

Each of the electrodes 122 and 124 has a single-stepped cross-section. Electrode 122 (the "hot" electrode) has a thin portion 123 and a thick portion 125. Electrode 124 (the "ground" electrode) has a thin portion 127 and a thick portion 129. The electrodes are arranged face-to-face, with the thin portion of one electrode facing the thick portion of the other electrode. Ceramic insert 126 is located between thick portion 125 of electrode 122 and thin portion 127 of electrode 124 in contact therewith. As in other above described embodiments, the ceramic insert extends laterally beyond the electrode edges (here edges 122E and 124E) to minimize the possibility of a surface arcing over the ceramic between the electrodes. For this same reason, ceramic insert 126 preferably also extends laterally beyond thick portion 125 of electrode 122 toward thick portion 129 of electrode 124. Most preferably the width of the ceramic insert is sufficiently greater than the width of thin portion of electrode 124 than the ceramic insert contacts thick portion 129 of electrode 124.

Discharge gap 26 is formed between thick portion 129 of electrode 124 and thin portion 123 of electrode 122. Thick portion 125 of electrode 122 has a plurality of apertures 130 extending therethrough to facilitate flow of lasing gas into discharge gap 26 and to preventing acoustic resonances from occurring under pulsed discharge conditions, as discussed above. Gap 26 is open along the edges of the electrodes formed by thick portion 129 of electrode 124 and thin portion 123 of electrode 122, although this is entirely visible in FIG. 6. Spacing between the electrodes is maintained by ceramic clamps 18, attached to edges 122E and 124E of the electrodes by screws 20.

Electrodes 122 and 124 can be defined as having a step height S, being the difference in thickness between the thin and thick portions of the electrodes. Ceramic insert has a thickness C, which is less than the step height S. Preferably the height of ceramic insert S is between about 25% and 75% of the step height. Discharge gap 26 has a width W determined by the width of thick portion 129 of electrode 124. There is a distance Y between the thin portions of the electrodes, which distance is equal to the step height S plus the height of discharge gap 26. The total electrode width is E. Thin portion 123 of electrode 122 has a width (W+X). Values of X and Y are selected to minimize the possibility of a discharge occurring between the thin portions of the electrodes. In one example of a laser 120 having a capability of 400 W output power, the length of electrodes 122 and 124 is 82.5 cm, the width (W) of discharge gap 26 is 55.0 mm. The discharge gap height (Y−S) is 1.2 mm, S is 3.8 mm, E is 88.0 mm, Y is 5 mm, X is 5.0 mm. The thickness C of dielectric insert 126 C is 1.0 mm. The width of the dielectric insert 126, is 29 mm and the length of the dielectric insert is equal to the length of ground electrode 124. For a given pressure, the output power of the laser will scale directly with the discharge width (W) and the electrode length. The optimum discharge gap (Y−S) dimension will vary inversely with pressure.

Figure 7:
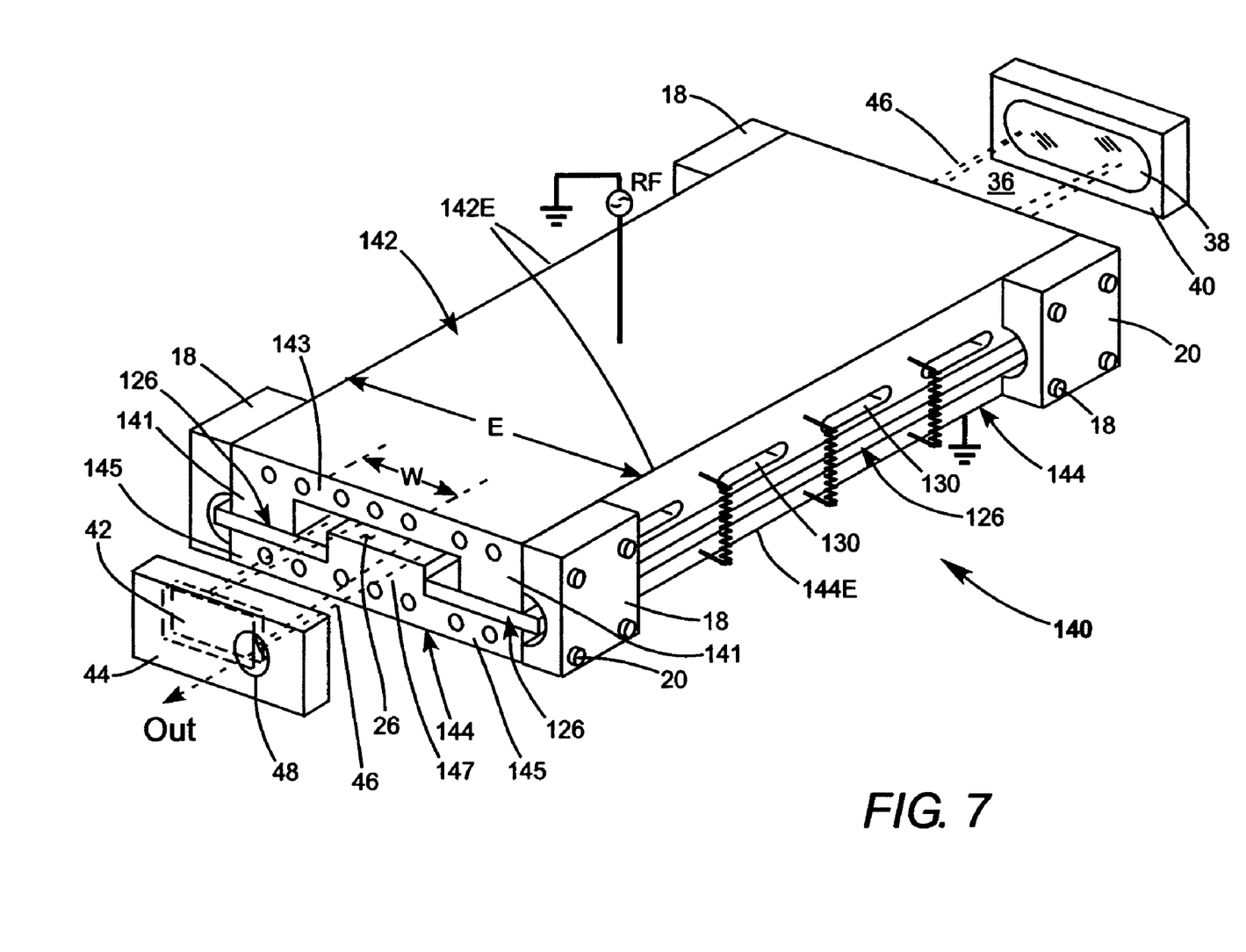
FIG. 7 illustrates a further preferred embodiment of a $CO_2$ slab laser in accordance with the present invention including first and second elongated metal slab electrodes each having a double-stepped cross-section and arranged face-to-face with ceramic inserts laterally partway between the electrodes, longitudinally along the length of the electrodes an each having a height less than the step height of the electrodes.

FIG. 7 schematically illustrates a further embodiment 140 of a slab laser in accordance with the present invention. Laser is similar in principle to a above-discussed laser 120 but includes slab electrodes 142 and 144 having a double-stepped cross-section. Electrode 142 (the "hot" electrode) has a thin portion 143 and two thick portions 141. Electrode 144 (the "ground" electrode) has two thin portions 145 and a thick portion 147. The electrodes are arranged face-to-face, with the thin portion of electrode 142 facing the thick portion of the electrode 144. A ceramic insert 126 is located between each of thick portions 141 of electrode 142 and the thin portions 145 of electrode 144. The ceramic inserts extends at least beyond the electrode edges to minimize the possibility of a surface arcing over the ceramic between the electrodes as discussed above with reference to laser 120 of FIG. 6. Discharge gap 26 is formed between thick portion 147 of electrode 144 and thin portion 143 of electrode 142.

Thick portions 141 of electrode 142 each a plurality of apertures 130 extending therethrough although the apertures are visible in only one thick portion in FIG. 7. These apertures are, as discussed above, to facilitate flow of lasing gas into discharge gap 26 and to prevent acoustic resonances from occurring under pulsed discharge conditions. Spacing between the electrodes is maintained by ceramic clamps 18, attached to edges 142E and 144E of the electrodes by screws 20. Laser 140 potentially has a higher inter-electrode capacitance and a lesser difference in capacitance between lit and unlit conditions than laser 120 of FIG. 6. This is achieved, however, at the expense of not having one side of discharge gap fully open for facilitating gas flow into the gap. For this purpose, reliance, here, is placed primarily on ports 30 in the thick portions of electrode 142.

Those skilled in the art to which the present invention pertains will recognize without further illustration that while lasers 60, 70, 120, and 140 are depicted without ceramic waveguide extensions between electrodes and mirrors, such extensions may be, and preferably are, incorporated in a configuration similar to that described above with reference to extensions 21 and 23 of laser 10 of FIG. 1A. Preferably, such extensions for lasers 60 and 70 have the same cross-section shape as the electrodes to which they correspond.

The present invention is described above in terms of a preferred and other embodiments. The invention is not limited, however, by the embodiments described and depicted. Rather, the invention is limited only by the claims appended hereto.

What is claimed is:

1. A laser comprising:

first and second elongated electrodes, said first and second electrodes each having a stepped cross-section including a thick portion and a thin portion, said thin portion of said first electrode being wider than said thick portion of said second electrode, said electrodes having a step height defined by the difference in thickness between said thick and thin portions thereof;

said electrodes being arranged spaced apart and face-to-face with said thin and thick portions of said first electrode facing respectively said thick and thin portions of said second electrode, where the spacing between said electrodes being arranged such that an elongated discharge gap is formed between said thin portion of said first electrode and said thick portion of said second electrode, said discharge gap having a height and a width, said discharge gap width being about equal to the width of said thick portion of said second electrode and said discharge gap being filled with a lasing gas;

a solid dielectric insert extending longitudinally along the length of said electrodes, said insert having a height less than said step height and being located between said thick portion of said first electrode and said thin portion of said second electrode and in contact therewith;

a pair of mirrors configured and arranged to define a laser resonant cavity extending through said elongated discharge gap;

means for exciting said lasing gas to create a gas discharge in said discharge gap, thereby causing laser radiation to circulate in said resonant cavity; and wherein the height of said discharge gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

2. The laser of claim 1, wherein said dielectric insert has a width greater than the width of said thin portion of said second electrode, extends laterally beyond corresponding outer edges of said first and second electrodes and extends laterally beyond said thick portion of said first electrode toward said thick portion of said second electrode.

3. The laser of claim 2, wherein said dielectric insert is in contact with said thick portion of said second electrode.

4. A laser comprising:

first and second elongated electrodes, said first and second electrodes each having a stepped cross-section, said first electrode including two thick portions bounding a thin portion and said second electrode including two thin portions bounding a thick portion, said thin portion of said first electrode being wider than said thick portion of said second electrode, said electrodes having a step height defined by the difference in thickness between said thick and thin portions thereof;

said electrodes being arranged spaced apart and face-to-face with said thin and thick portions of said first electrode facing respectively said thick and thin portions of said second electrode, spacing between said electrodes being arranged such that an elongated discharge gap is formed between said thin portion of said first electrode and said thick portion of said second electrode, said discharge gap having a height and a width, said discharge gap width being about equal to the width of said thick portion of said second electrode and said discharge gap being filled with a lasing gas;

two solid dielectric inserts extending longitudinally along the length of said electrodes, said inserts having a height less than said step height and one thereof being located between each said thick portions of said first electrode and said thin portions of said second electrode and in contact therewith;

a pair of mirrors configured and arranged to define a laser resonant cavity extending through said elongated discharge gap;

means for exciting said lasing gas to create a gas discharge in said discharge gap, thereby causing laser radiation to circulate in said resonant cavity; and wherein the height of said discharge gap is selected such that said gap forms a waveguide for said laser radiation in the height direction, and the width of said gap is selected such that said laser radiation is allowed to propagate in free space in the width direction of said gap in a manner controlled by said configuration and arrangement of said mirrors.

5. The laser of claim 4, wherein each of said dielectric inserts has a width greater than the width of said thin portions of said second electrode and extend laterally beyond corresponding outer edges of said first and second electrodes and extend laterally beyond said thick portions of said first electrode toward said thick portion of said second electrode.

6. The laser of claim 5, wherein said dielectric insert is in contact with said thick portion of said second electrode.

\* \* \* \* \*